US007725921B2

(12) United States Patent
Trutner et al.

(10) Patent No.: US 7,725,921 B2
(45) Date of Patent: May 25, 2010

(54) SYSTEMS AND METHODS FOR MANAGING NETWORKS

(75) Inventors: Oren Trutner, Kirkland, WA (US); Adi Kurtz, Moshav Bet Hanania (IL); Adina Hagege, Zichron Yakov (IL); Boaz Ein-Gil, Haifa (IL); Keren Goltz, Kibutz Hahotrim (IL); Linda Lior, Zichron Yaacov (IL); Uri Ben-Zew, Haifa (IL)

(73) Assignee: Microsoft Corporation, Redmond, WA (US)

( * ) Notice: Subject to any disclaimer, the term of this patent is extended or adjusted under 35 U.S.C. 154(b) by 1296 days.

(21) Appl. No.: 10/830,912

(22) Filed: Apr. 22, 2004

(65) Prior Publication Data

US 2005/0240990 A1 Oct. 27, 2005

(51) Int. Cl.
*H04L 9/00* (2006.01)
(52) U.S. Cl. ........................................................ 726/1
(58) Field of Classification Search .................... 726/11, 726/13, 15, 1, 14
See application file for complete search history.

(56) References Cited

U.S. PATENT DOCUMENTS

| 6,336,138 | B1 | 1/2002 | Caswell et al. |
| 6,484,261 | B1* | 11/2002 | Wiegel ........................ 726/11 |
| 6,539,483 | B1 | 3/2003 | Harrison et al. |
| 6,785,728 | B1* | 8/2004 | Schneider et al. ........... 709/229 |
| 2002/0069200 | A1* | 6/2002 | Cooper et al. ................... 707/9 |
| 2003/0154404 | A1* | 8/2003 | Beadles et al. .............. 713/201 |
| 2004/0111643 | A1* | 6/2004 | Farmer ........................ 713/201 |
| 2004/0181690 | A1* | 9/2004 | Rothermel et al. .......... 713/201 |

\* cited by examiner

*Primary Examiner*—Ellen Tran
(74) *Attorney, Agent, or Firm*—Lee & Hayes, PLLC

(57) ABSTRACT

The described systems and methods are directed at managing networks using network templates. Each network template is associated with a different network topology and includes parameters for implementing the associated network topology. A user may implement a particular network topology by selecting a corresponding network template. A configurator may be used to configure a network device to implement the network topology associated with the selected network template based, at least in part, on the parameters.

29 Claims, 11 Drawing Sheets

SYSTEMS AND METHODS FOR MANAGING NETWORKS

TECHNICAL FIELD

This systems and methods discussed herein relate to network management.

BACKGROUND OF THE INVENTION

The process of configuring a firewall with information about network topology and security policy is often laborious and error prone. A user typically has to manually configure the firewall to obtain the desired topology and policy. This process requires the user to individually identify each network in the network topology, each relationship between networks, and each policy that is required. Such a labor-intensive process provides many opportunities for errors and does not provide feedback to the user about the level of security provided.

One existing solution attempts to reduce the labor required to manually configure a firewall by limiting the firewall to a single pre-defined network topology that is directly associated with network interface in the firewall device. However, this prior solution fails to allow the firewall to adapt to complex network topologies. The solution also fails to provide an easy and intuitive process for defining security policies.

Thus, there is a need for a reliable method to configure a firewall that is user-friendly and adaptable to complex network topologies.

SUMMARY OF THE INVENTION

The systems and methods described herein are directed at managing networks using network templates. Each network template is associated with a different network topology and includes parameters for implementing the associated network topology. Each network template may also include a set of policies that are compatible with the corresponding network topology. A user may implement a particular network topology by selecting a corresponding network template. A configurator may be used to configure a network device to implement the network topology associated with the selected network template based, at least in part, on the parameters. The user may select one or more policies included in the selected network template to configure the network device.

In another aspect, the addresses associated with private networks included in the selected network template are determined. The configurator may configure the network device with the addresses.

DETAILED DESCRIPTION

The systems and methods described herein enable a user to implement a network topology by selecting from a list of pre-defined and pre-tested network templates. Once a network template has been selected, the user can select from a list of pre-defined and pre-tested security policies that are tailored for the network topology associated with the select network template. Network templates may be implemented, for example, by a configurator that controls a firewall. The views of the graphical user interface associated with the configurator display the details of the current network topology, which may include networks, groups of networks and routing/address translation relationships between networks. The user interface also enables the user to select a network template by simply selecting from the list with a mouse or keyboard. Once a network template has been selected, a secondary wizard window opens and guides the user in the process of customizing the network template to the desired scenario. The wizard queries the user for network addresses to be used for each of the networks in the network template. The wizard also presents the user with a selection of security policies tailored for the template. Once the user selects a template and a security policy, the firewall network and policy configurations are changed to match the customized network template. These and other aspects will be described in more detail in the description below.

Figure 1:
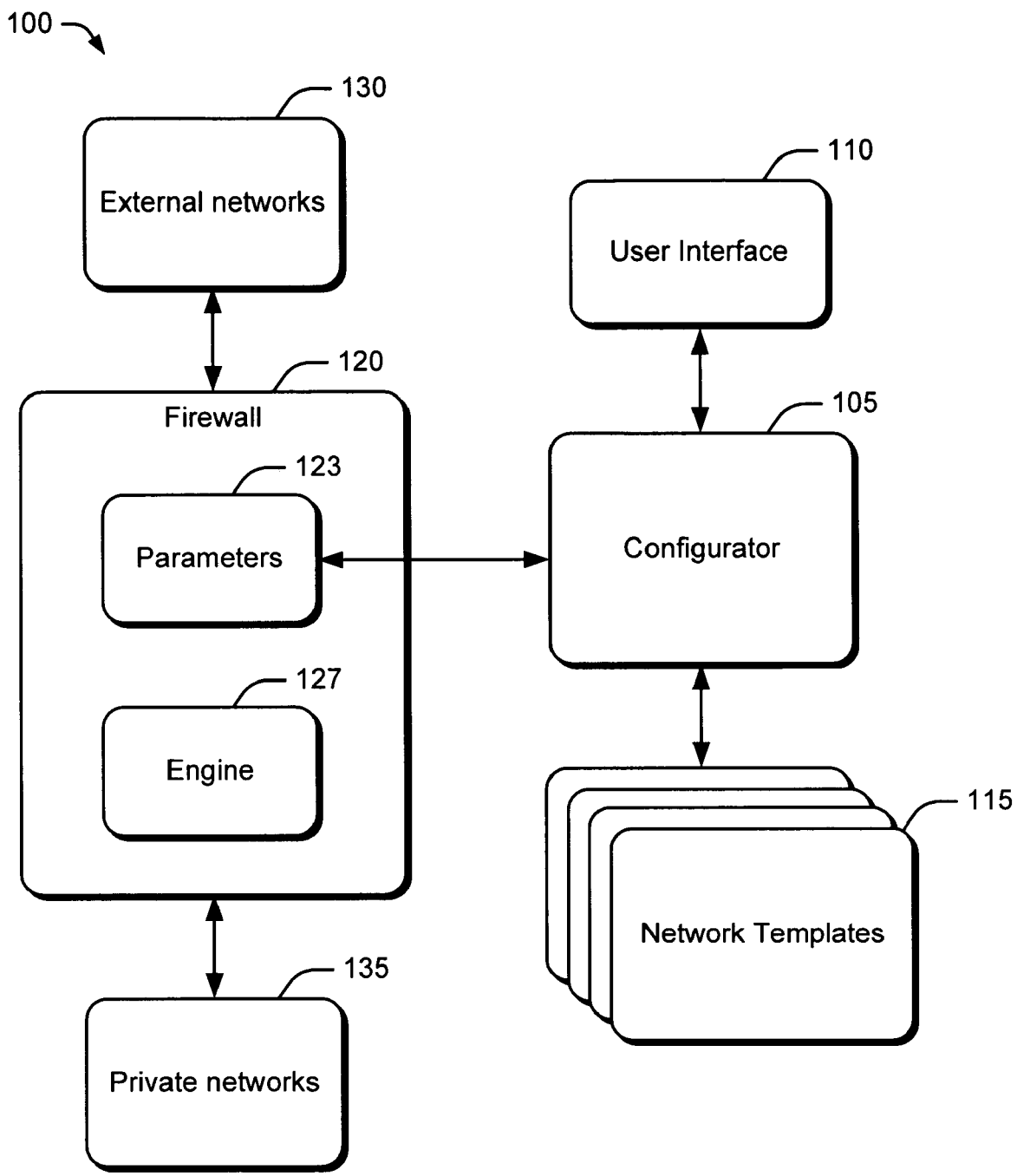
FIG. 1 is a schematic diagram showing a system for implementing a network topology.

FIG. 1 is a schematic diagram showing a system 100 for implementing a network topology. System 100 may include a firewall 120 and a configurator 105. As shown in FIG. 1, firewall 120 is coupled to external networks 130 and private networks 135. Private networks 135 may include any type of network that is intended to provide authorized users with access, such as an intranet. External networks 130 may include any network that is outside private networks 135, such as a wide area network (WAN) and the Internet.

Firewall 120 is a network device that is configured to prevent unauthorized users in external networks 130 from accessing private networks 135. Typically, messages entering or leaving private networks 135 pass through firewall 120, which examines the messages and blocks those that do not meet the specified security criteria. Firewall 120 is configured to implement a network topology associated with private networks 135. A network topology defines how networks in a network infrastructure are related to one another. Firewall 120 may implement a particular network topology in accordance with parameters 123, which may include information about the particular network topology, such as addresses, relationship, policy, and the like.

Firewall 120 includes an engine 127 that performs various firewall functions, such as blocking messages, routing packets, assigning IP addresses, applying policies, and the like. Engine 127 may perform these functions based on parameters 123. Although the systems and methods are described herein in conjunction with a firewall, it is to be understood that other network devices that are capable of performing the same functions as a firewall may also be used in system 100.

Configurator 105 is a computer-executable component programmed to configure firewall 120. Configurator 105 may be implemented on any computing device. For example, configurator 105 may be incorporated in a computing device along with firewall 120 or in a server coupled to firewall 120. As shown in FIG. 1, configurator 105 may include a plurality of network templates 115. Each of the network templates 115 is associated with a different network topology and includes parameters for implementing the associated network topology. Example parameters that may be included in network templates 115 will be discussed in conjunction with FIG. 2. An example process that may be used by configurator 105 to configure firewall 120 will be discussed in conjunction with FIG. 3.

Network templates 115 may include parameters for implementing network topologies, such as an edge firewall, a 3-Leg perimeter or demilitarized zone (DMZ), a front firewall, a back firewall, a departmental firewall, a branch office, and a line filter. An edge firewall topology places a firewall between an external network and an internal network to protect the internal network against unauthorized users in the external network. A 3-Leg DMZ topology provides improved protection to an internal network while sacrificing some protection to a separate DMZ network in the perimeter to enable servers on the DMZ network to effectively provide services to users in an external network. Front firewall topology provides protection to a DMZ network that separates an internal network from an external network. Back firewall topology connects an internal network to an external network through a DMZ network and provides an additional layer of protection. A departmental firewall topology protects a departmental network from unauthorized access and internal attacks. A branch office topology enables a branch office to connect to a main office with a Virtual Private Network (VPN). A line filter topology places a firewall at a strategic point in a private network to stop viruses, hacks and Trojan horses.

Configurator 105 may include user interface 110 to enable a user to configure firewall 120 through configurator 105. An example user interface for configurator 105 will be discussed in conjunction with FIG. 4-10. Briefly stated, user interface 110 may enable a user to select from network templates 115 to implement a particular network topology. User interface 110 may also allow the user to select policies, to add and customize network templates, to provide addresses of private networks, and to view the current and the prospective settings of a firewall. User interface 110 may be configured to present a particular network topology in a graphical format to enhance user-friendliness. To provide a more user-friendly environment, user interface 110 may be configured to provide a wizard utility to help the user to input the necessary information for selecting and implementing a particular network topology.

Figure 2:
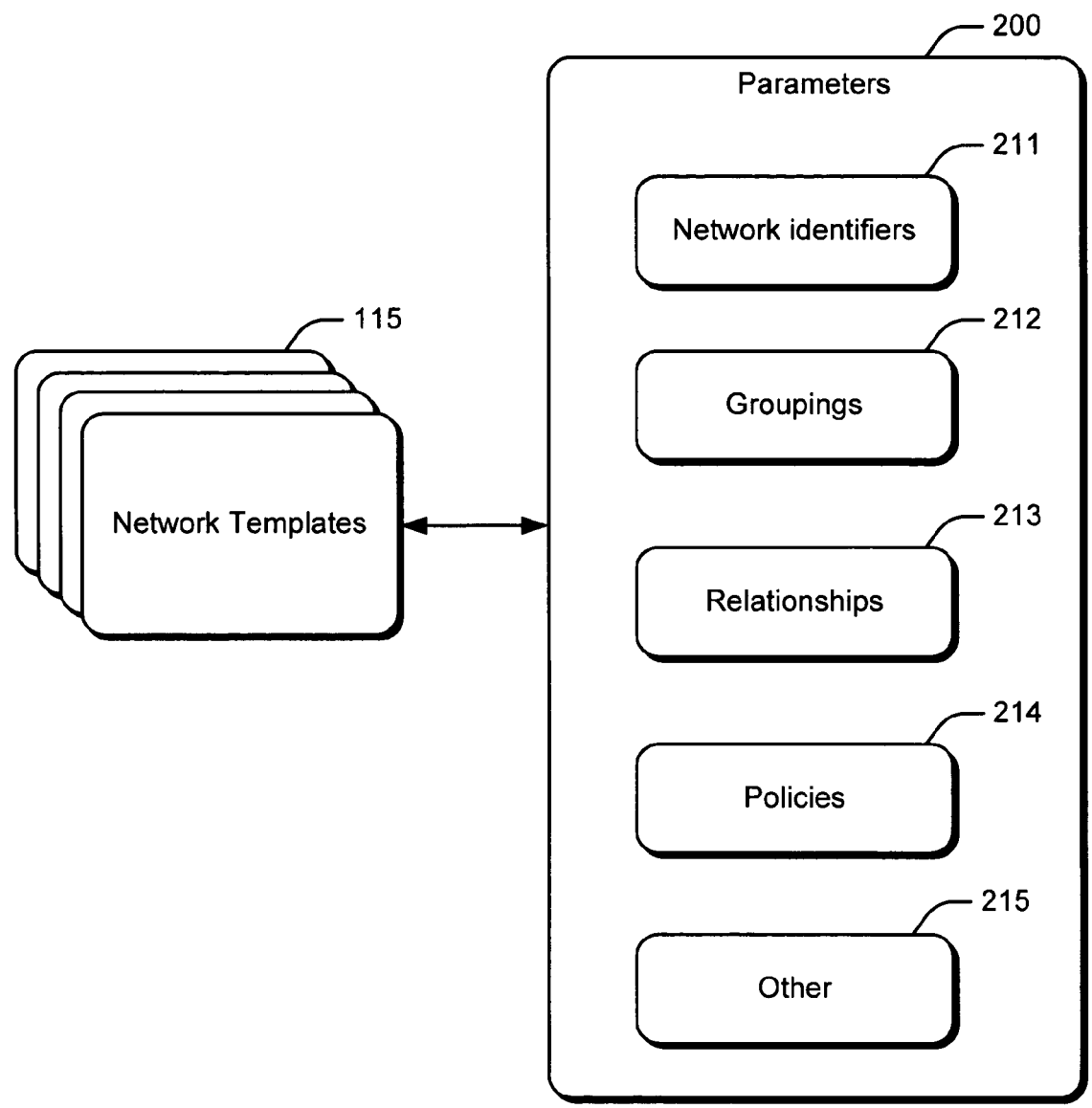
FIG. 2 is a schematic diagram showing example parameters that may be included in network templates.

FIG. 2 is a schematic diagram showing example parameters 200 that may be included in network templates 115. As shown in FIG. 2, parameters 200 may include network identifiers 211, groupings 212, relationships 213, policies 214 and other information 215. Network identifiers 211 represent networks and network nodes that are included in the particular network topology associated with a network template. Network identifiers 211 may represent any type of network or network node, such as an internal network, a perimeter network or DMZ, roaming users, a departmental network, a virtual private network (VPN), the Internet, and the like. Network identifiers 211 may include a variety of information about each network, such as a name, an alias, an address, a location in the network topology, and the like.

Groupings 212 represent groups of networks in a particular network topology. Each network template may include one or more groups of networks. Each group may be treated in a collective manner. For example, a specific set of policies may be collectively applied to a specific group of networks but not to other groups. Relationships 213 represent how networks in a particular network topology relate and interact with each other. Policies 214 represent rules for a firewall to perform actions for networks in a particular network topology. Policies 214 typically include multiple security policies for each network topology associated with a network template. A user may select one or more of the security polices for a given network template. Each security policy offers different levels of security. Other information 215 may include any type of information that is associated with a particular network template. For example, other information 215 may include information for presenting network templates 115 to the user for selection and implementation in a user interface.

Figure 3:
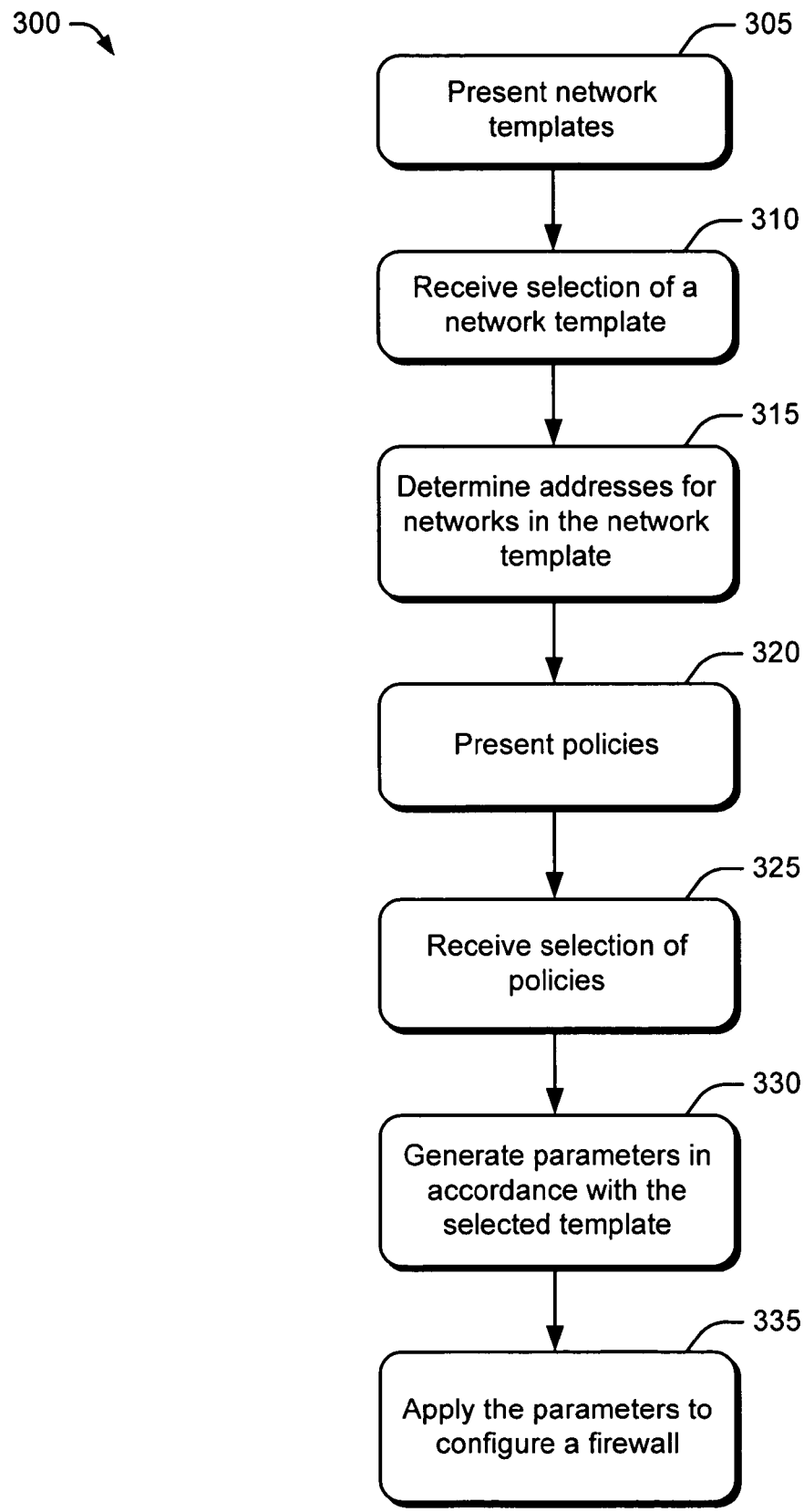
FIG. 3 is an operational flow diagram of an example process that may be used by a configurator to configure a firewall.

FIG. 3 is an operational flow diagram of an example process 300 that may be used by a configurator to configure a firewall. At block 305, network templates are presented to a user for selection. To provide a user-friendly environment, network templates may be presented to the user in a graphical user interface. The network topologies associated with the network templates may be graphically illustrated to intuitively provide information about the network templates to the user. At block 310, a selection of a particular network template is received.

At block 315, the addresses for networks associated with the network template are determined. The addresses are necessary for implementing the network topology associated with the selected network template. The configurator may automatically determine the addresses or receive the addresses from the user. To enhance user-friendliness, a wizard utility may be used to aid the user in providing the addresses for the networks associated with the selected network template.

At block 320, policies included in the selected network templates are presented to the user for selection. Multiple policies may be included in each network template. These policies may be evaluated and tested to ensure compatibility with the network topology of the network template. For example, a network template typically includes multiple security policies for a user to select. These security policies are tested for compatibility and provide varying levels of security and network performance. At block 325, a selection of one or more policies is received from the user. It is to be understood that each network template may include a default policy and the configurator may be programmed to use the default policy without a user selection.

At block 330, parameters are generated in accordance with the selected network template. The determined addresses and selected policies may also be used to generate the parameters. At block 335, the parameters are applied to configure a firewall to implement the network topology associated with the selected network template.

For illustrative purpose, examples of parameters and policies for several network templates are shown below in Tables A-E.

TABLE A

Parameters and policies for Standard Edge Firewall network template.

| | |
|---|---|
| Edge Firewall | Standard |
| Network identifiers | The Internet |
| | Internal Network |
| Description | "ISA Server will connect your network to the Internet and protect it from attacks. Use this option to protect a single network" |
| Network Relationships | Internal Network, VPN Clients, Quarantine → The Internet: NAT |
| | VPN Clients, Quarantine → Internal Network: Route |
| Default Policy 1 | "No access" |
| | Description: |
| | "Prevent any network access through the firewall. Use this option when you want to define the entire policy on your own. |
| | This option requires that network infrastructure services (such as DNS) are available in the Internal network." |
| | <no rules> |
| Default Policy 2 | "No access - ISP network services" |
| | Description: |
| | "Prevent any network access through the firewall except for network infrastructure services. Use this option when you want to define the entire policy on your own. |
| | This option is useful when network infrastructure services (such as DNS) are provided by your Internet Service Provider (ISP). |
| | The following rules will be created: |
| | 1. DNS: Allow DNS from Internal Network, VPN Clients to The Internet" |
| Default Policy 3 | "Restricted web access" |
| | Description: |
| | "Allow access to web sites, but no other network access through the firewall. Use this option when you want to allow only web access. You can modify the policy later to allow other types of network access. |
| | This option requires that network infrastructure services (such as DNS) are available in the Internal network." |
| | The following rules will be created: |
| | Web access: Allow HTTP, HTTPS, FTP from Internal Network, VPN Clients to The Internet |
| | VPN: Allow all protocols from VPN Clients to Internal Network" |
| Default Policy 4 | "Restricted web access - ISP network services" |
| | Description: |
| | "Allow access to web sites, but no other network access through the firewall. Use this option when you want to allow only web access. You can modify the policy later to allow other types of network access. |
| | This option is useful when network infrastructure services (such as DNS) are provided by your Internet Service Provider (ISP). |
| | The following rules will be created: |
| | Web access: Allow HTTP, HTTPS, FTP from Internal Network, VPN Clients to The Internet" |
| | DNS: Allow DNS from Internal Network, VPN Clients to The Internet |
| | VPN: Allow all protocols from VPN Clients to Internal Network" |
| Default Policy 5 | "Unrestricted Internet access" |
| | Description: |
| | "Allow all types of access to the Internet through the firewall. The firewall will prevent access from the Internet to the protected network. Use this option when you want to allow all Internet access. You can modify the policy later to stop some types of network access. |
| | The following rules will be created: |
| | Internet access: Allow all protocols from Internal Network, VPN Clients to The Internet |
| | VPN: Allow all protocols from VPN Clients to Internal Network" |

TABLE B

Parameters and policies for 3-Leg DMZ network template.

| | |
|---|---|
| 3-Leg DMZ | Standard |
| Networks | The Internet |
| | Internel Network |
| | DMZ |
| Description | "ISA Server will connect your network to the Internet, protect it from attacks, and securely publish services to the Internet. Use this option to protect an internal network and a dedicated DMZ network that hosts Internet services" |

TABLE B-continued

Parameters and policies for 3-Leg DMZ network template.

| | |
|---|---|
| Network Relationships | Internal Network, VPN Clients, Quarantine → The Internet: NAT<br>DMZ → The Internet: Route<br>Internal Network, VPN Clients, Quarantine → DMZ: NAT<br>VPN Clients, Quarantine → Internal Network: Route |
| Policy 1 | "No access"<br>Description:<br>"Prevent any network access through the firewall. Use this option when you want to define the entire policy on your own.<br>This option requires that network infrastructure services (such as DNS) are available in the Internal network."<br><no rules> |
| Policy 2 | "No access - network services on DMZ"<br>Description:<br>"Prevent any network access through the firewall except for network infrastructure services. Use this option when you want to define the entire policy on your own.<br>This option is useful when network infrastructure services (such as DNS) are available in the DMZ network.<br>The following rules will be created:<br>1. DNS: Allow DNS from Internal Network, VPN Clients to DMZ" |
| Policy 3 | "No access - ISP network services"<br>Description:<br>"Prevent any network access through the firewall except for network infrastructure services. Use this option when you want to define the entire policy on your own.<br>This option is useful when network infrastructure services (such as DNS) are provided by your Internet Service Provider (ISP).<br>The following rules will be created:<br>1. DNS: Allow DNS from Internal Network, VPN Clients, DMZ to The Internet" |
| Policy 4 | "Restricted web access"<br>Description:<br>"Allow access to web sites, but no other network access through the firewall. Use this option when you want to allow only web access. You can modify the policy later to allow other types of network access.<br>This option requires that network infrastructure services (such as DNS) are available in the Internal network.<br>The following rules will be created:<br>Web access: Allow HTTP, HTTPS, FTP from Internal Network, VPN Clients to The Internet, DMZ<br>VPN: Allow all protocols from VPN Clients to Internal Network" |
| Policy 5 | "Restricted web access - network services on DMZ"<br>Description:<br>"Allow access to web sites, but no other network access through the firewall. Use this option when you want to allow only web access. You can modify the policy later to allow other types of network access.<br>This option is useful when network infrastructure services (such as DNS) are available in the DMZ network.<br>The following rules will be created:<br>Web access: Allow HTTP, HTTPS, FTP from Internal Network, VPN Clients to The Internet, DMZ<br>DNS: Allow DNS from Internal Network, VPN Clients to DMZ<br>VPN: Allow all protocols from VPN Clients to Internal Network" |
| Policy 6 | "Restricted web access - ISP network services"<br>Description:<br>"Allow access to web sites, but no other network access through the firewall. Use this option when you want to allow only web access. You can modify the policy later to allow other types of network access.<br>This option is useful when network infrastructure services (such as DNS) are provided by your Internet Service Provider (ISP).<br>The following rules will be created:<br>Web access: Allow HTTP, HTTPS, FTP from Internal Network, VPN Clients to The Internet, DMZ"<br>DNS: Allow DNS from Internal Network, VPN Clients, DMZ to The Internet<br>VPN: Allow all protocols from VPN Clients to Internal Network" |
| Policy 7 | "Unrestricted Internet access"<br>Description:<br>"Allow all types of access to the Internet through the firewall. The firewall will prevent access from the Internet to the protected networks. Use this option when you want to allow all Internet access. You can modify the policy later to stop some types of network access. |

TABLE B-continued

Parameters and policies for 3-Leg DMZ network template.

The following rules will be created:
Internet access: Allow all protocols from Internal Network, VPN Clients to The Internet, DMZ
VPN: Allow all protocols from VPN Clients to Internal Network"
Rules:
ALLOW all FROM Protected Networks TO The Internet, DMZ

TABLE C

Parameters and policies for front firewall network template.

| | |
|---|---|
| Front Firewall | Standard |
| Network identifiers | The Internet |
| | DMZ |
| Description | "ISA Server will serve as the first line of defense in a two-layer configuration. Use this option when you have two firewalls between the protected network and the Internet" |
| Network Relationships | DMZ, VPN Clients, Quarantine → The Internet: Route |
| | VPN Clients, Quarantine → DMZ: Route |
| Other Policy Elements | Back Firewall (computer) |
| Policy 1 | "No access - network services on DMZ" |
| | Description: |
| | "Prevent any network access through the firewall. Use this option when you want to define the entire policy on your own. |
| | This option is useful when network infrastructure services (such as DNS) are available in the DMZ network. |
| | <no rules> |
| Policy 2 | "No access - ISP network services" |
| | Description: |
| | "Prevent any network access through the firewall except for network infrastructure services. Use this option when you want to define the entire policy on your own. |
| | This option is useful when network infrastructure services (such as DNS) are provided by your Internet Service Provider (ISP). |
| | The following rules will be created: |
| | 1. DNS: Allow DNS from DMZ, VPN Clients to The Internet" |
| Policy 3 | "Restricted web access - network services on DMZ" |
| | Description: |
| | "Allow access to web sites, but no other network access through the firewall. Use this option when you want to allow only web access. You can modify the policy later to allow other types of network access. |
| | This option requires that network infrastructure services (such as DNS) are available in the DMZ network. |
| | The following rules will be created: |
| | Web access: Allow HTTP, HTTPS, FTP from DMZ, VPN Clients to The Internet |
| | VPN: Allow all protocols from VPN Clients to DMZ" |
| | Note: a better design might allow only web access traffic coming from the back firewall. The current implementation of the network template wizard does not allow asking the user for the identity of the back firewall. |
| Policy 4 | "Restricted web access - ISP network services" |
| | Description: |
| | "Allow access to web sites, but no other network access through the firewall. Use this option when you want to allow only web access. You can modify the policy later to allow other types of network access. |
| | This option requires that network infrastructure services (such as DNS) are available in the DMZ network. |
| | The following rules will be created: |
| | Web access: Allow HTTP, HTTPS, FTP from DMZ, VPN Clients to The Internet |
| | DNS: Allow DNS from DMZ, VPN Clients to The Internet |
| | VPN: Allow all protocols from VPN Clients to DMZ" |
| | Note: a better design might allow only web access traffic coming from the back firewall. The current implementation of the network template wizard does not allow asking the user for the identity of the back firewall. |
| Policy 5 | "Unrestricted Internet access" |
| | Description: |
| | "Allow all types of access to the Internet through the firewall. The firewall will prevent access from the Internet to the protected networks. Use this option when you want to allow all Internet access. |

TABLE C-continued

Parameters and policies for front firewall network template.

|  |  |
|---|---|
|  | You can modify the policy later to stop some types of network access. The following rules will be created: Internet access: Allow all protocols from DMZ, VPN Clients to The Internet VPN: Allow all protocols from VPN Clients to DMZ" |

TABLE D

Parameters and policies for back firewall network template.

| | |
|---|---|
| Back Firewall | Standard |
| Network identifiers | External Network |
| | Internal Network |
| Description | "ISA Server will serve as the second line of defense in a two-layer configuration. Use this option when you have two firewalls between the protected network and the Internet" |
| Network Relationships | Internal Network, VPN Clients, Quarantine → External Network: NAT |
| | VPN Clients, Quarantine → Internal Network: Route |
| Other Policy Elements | Front Firewall (computer) |
| | DMZ (address range) |
| Policy 1 | "No access" |
| | Description: |
| | "Prevent any network access through the firewall. Use this option when you want to define the entire policy on your own. This option requires that network infrastructure services (such as DNS) are available in the Internal network." |
| | <no rules> |
| Policy 2 | "No access - network services on DMZ" |
| | Description: |
| | "Prevent any network access through the firewall except for network infrastructure services. Use this option when you want to define the entire policy on your own. This option is useful when network infrastructure services (such as DNS) are available in the DMZ network. The following rules will be created: 1. DNS: Allow DNS from Internal Network, VPN Clients to DMZ" |
| Policy 3 | "No access - ISP network services" |
| | Description: |
| | "Prevent any network access through the firewall except for network infrastructure services. Use this option when you want to define the entire policy on your own. This option is useful when network infrastructure services (such as DNS) are provided by your Internet Service Provider (ISP). The following rules will be created: 1. DNS: Allow DNS from Internal Network, VPN Clients to External Network except for DMZ" |
| Policy 4 | "Restricted web access" |
| | Description: |
| | "Allow access to web sites, but no other network access through the firewall. Use this option when you want to allow only web access. You can modify the policy later to allow other types of network access. This option requires that network infrastructure services (such as DNS) are available in the Internal network. The following rules will be created: Web access: Allow HTTP, HTTPS, FTP from Internal Network, VPN Clients to External Network VPN: Allow all protocols from VPN Clients to Internal Network" |
| Policy 5 | "Restricted web access - network services on DMZ" |
| | Description: |
| | "Allow access to web sites, but no other network access through the firewall. Use this option when you want to allow only web access. You can modify the policy later to allow other types of network access. This option is useful when network infrastructure services (such as DNS) are available in the DMZ network. The following rules will be created: Web access: Allow HTTP, HTTPS, FTP from Internal Network, VPN Clients to External Network DNS: Allow DNS from Internal Network, VPN Clients to DMZ VPN: Allow all protocols from VPN Clients to Internal Network" |

TABLE D-continued

Parameters and policies for back firewall network template.

| | |
|---|---|
| Policy 6 | "Restricted web access - ISP network services"<br>Description:<br>"Allow access to web sites, but no other network access through the firewall. Use this option when you want to allow only web access. You can modify the policy later to allow other types of network access.<br>This option is useful when network infrastructure services (such as DNS) are provided by your Internet Service Provider (ISP).<br>The following rules will be created:<br>Web access: Allow HTTP, HTTPS, FTP from Internal Network, VPN Clients to External Network"<br>DNS: Allow DNS from Internal Network, VPN Clients to External Network except for DMZ<br>VPN: Allow all protocols from VPN Clients to Internal Network" |
| Policy 7 | "Unrestricted access"<br>Description:<br>"Allow all types of access to the Internet through the firewall. The firewall will prevent access from the Internet to the protected networks. Use this option when you want to allow all Internet access. You can modify the policy later to stop some types of network access.<br>The following rules will be created:<br>Allow all outbound traffic: Allow all protocols from Internal Network, VPN Clients to External Network<br>VPN: Allow all protocols from VPN Clients to Internal Network" |

TABLE E

Parameters and policies for Edge Firewall for Small Business Server network template.

| | |
|---|---|
| Edge Firewall | Small Business Server |
| Network identifiers | The Internet<br>Internal Network |
| Description | "ISA Server will connect your network to the Internet and protect it from attacks. Use this option when you are using Microsoft Small Business Server 2003" |
| Network Relationships | Internal Network, VPN Clients, Quarantine → The Internet: NAT<br>VPN Clients, Quarantine → Internal Network: Route |
| Policy 1 | "No access"<br>Description:<br>"Prevent any network access through the firewall. Use this option when you want to define the entire policy on your own.<br>Computers on the internal network will be allowed to access services provided by Small Business Server.<br>The following rules will be created:<br>1. SBS services: Allow all protocols from Internal Network, VPN Clients to Localhost" |
| Policy 2 | "Restricted web access"<br>Description:<br>"Allow access to web sites, but no other network access through the firewall. Use this option when you want to allow only web access. You can modify the policy later to allow other types of network access.<br>Computers on the internal network will be allowed to access services provided by Small Business Server.<br>The following rules will be created:<br>1. Web access: Allow HTTP, HTTPS, FTP from Internal Network, VPN Clients to The Internet<br>2. SBS services: Allow all protocols from Internal Network, VPN Clients to Localhost" |
| Policy 3 | "Unrestricted Internet access"<br>Description:<br>"Allow all types of access to the Internet through the firewall. The firewall will prevent access from the Internet to the protected network. Use this option when you want to allow all Internet access. You can modify the policy later to stop some types of network access. Computers on the internal network will be allowed to access services provided by Small Business Server.<br>The following rules will be created:<br>1. Internet access: Allow all protocols from Internal Network, VPN Clients to The Internet<br>2. SBS services: Allow all protocols from Internal Network, VPN Clients to Localhost" |

Figure 4:
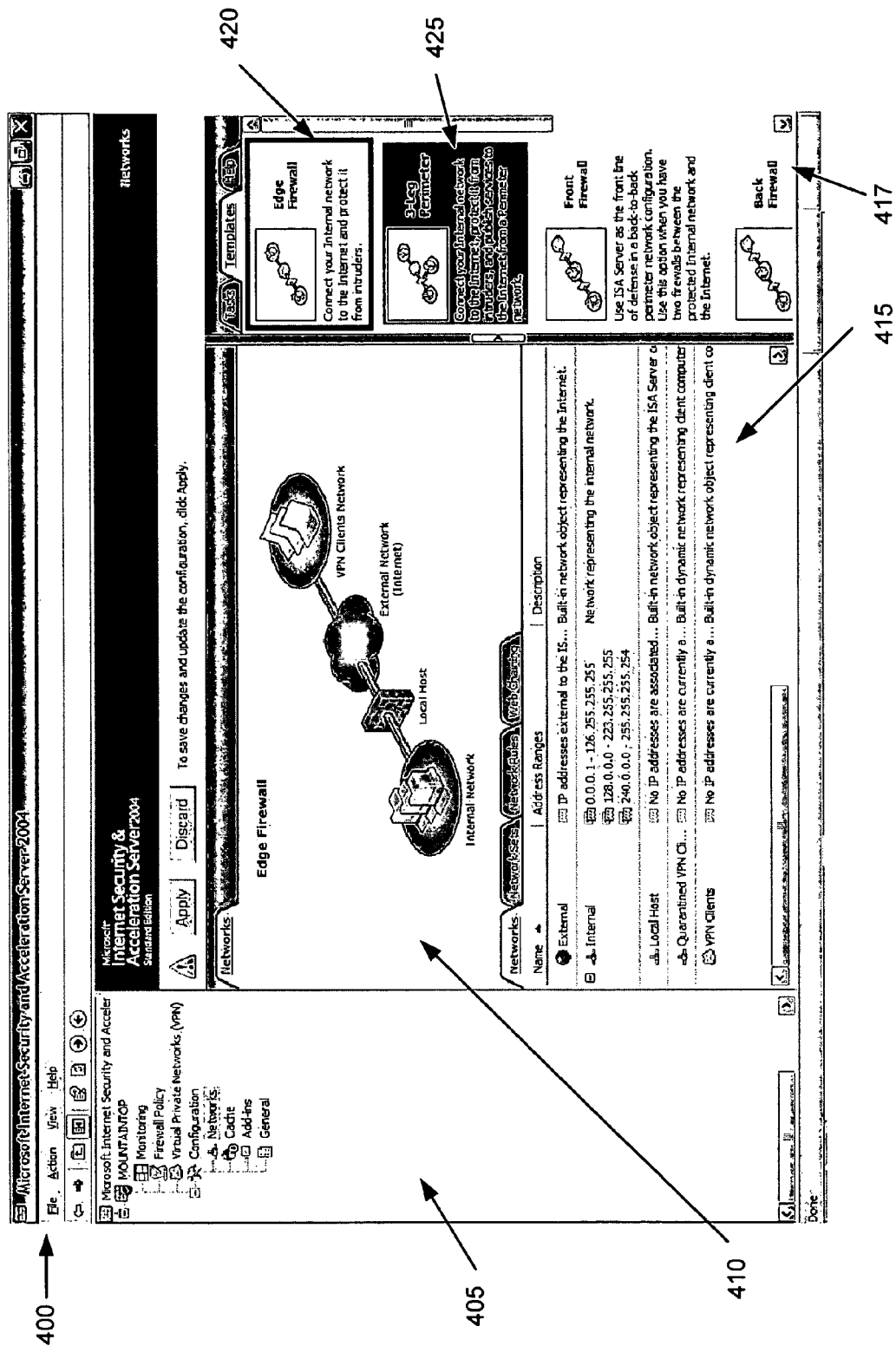
FIG. 4 is a screenshot of a user interface associated with a configurator.

FIG. 4 is a screenshot 400 of a user interface associated with a configurator. The user interface enables users to interact with the configurator for implementing network topologies using network templates. The user interface may include a navigation area 405, a graphical network view area 410, a parameter summary area 415, and a network template selection area 417.

Navigation area 405 allows users to select different views that are available on the configurator. As shown in FIG. 4, the "Configuration/Network" view has been selected. Graphical network view area 410 is configured to illustrate network topologies in an intuitive, graphical format. In screenshot 400, graphical network view area 410 graphically shows that the firewall controlled by the configurator is currently implementing an edge firewall topology associated with an edge firewall network template. Parameter summary area 415 is configured to show the parameters that are implemented by the currently activated network template.

Network template selection area 417 is configured to present the available network templates for user selection. Each network template may be presented in network template selection area 417 with a graphical illustration and a description to enhance user-friendliness. Network template selection area 417 may use a border 420 to show which network template is currently being used by the configurator to configure the firewall. In screenshot 400, the "3-Leg Perimeter" network template is being selected (as shown by highlight 425) to replace the current "Edge Firewall" network template.

Figure 5:
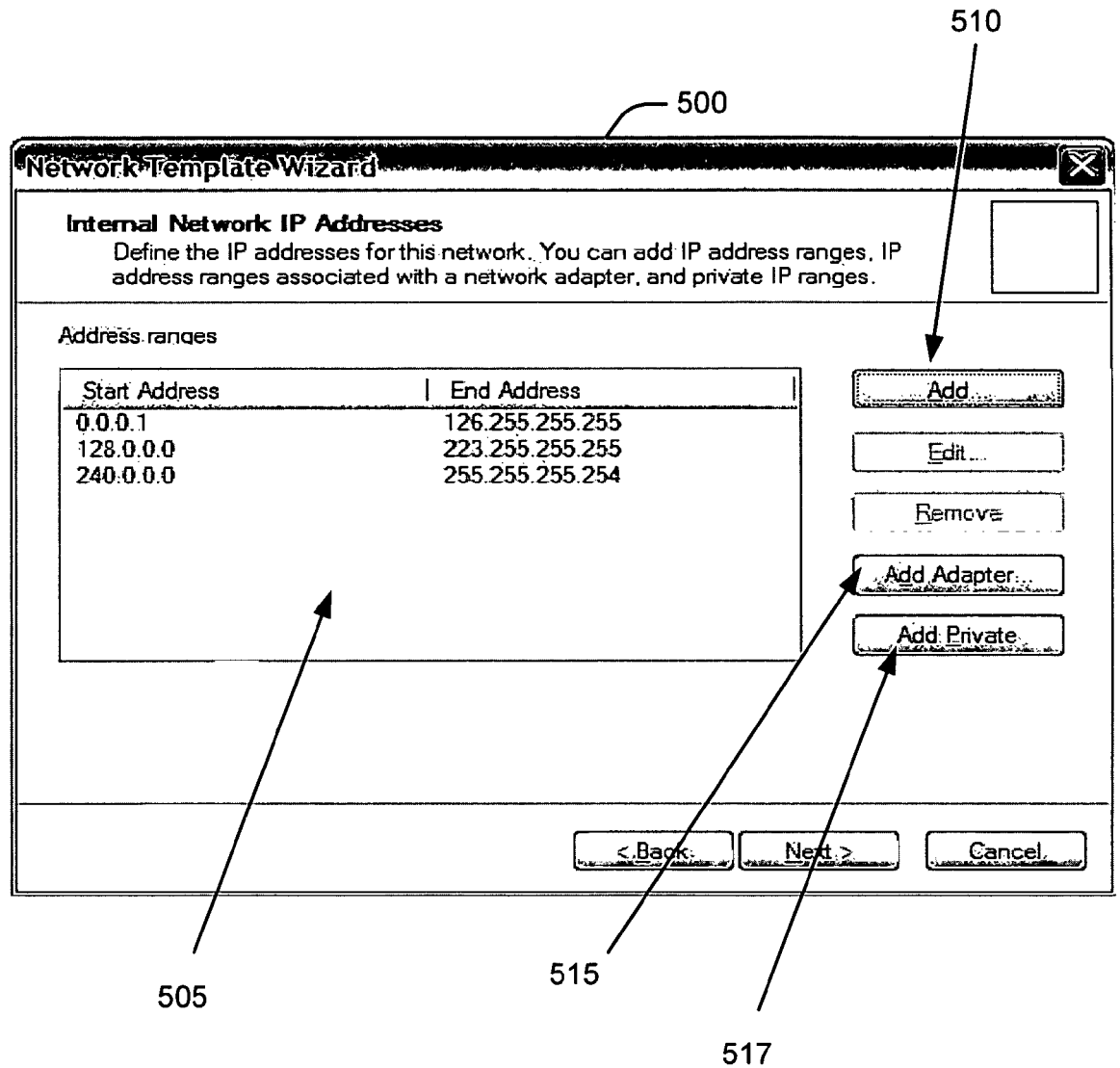
FIG. 5 is a screenshot of a wizard utility associated with a configurator.

FIG. 5 is a screenshot 500 of a wizard utility associated with a configurator. After a network template has been selected by a user, the user interface of the configurator may employ the wizard utility to help the user to input information for implementing the network topology associated with the selected network template. The wizard utility shown in screenshot 500 is currently accepting information related to the addresses of the internal networks associated with a 3-Leg Perimeter network topology. The wizard utility may include an address range area 505 to show the address ranges for the selected network template. As shown in FIG. 5, the configurator has determined some address ranges from a previously implemented network topology and these ranges have been automatically entered. A user may add an address range by activating the add button 510, a network adaptor by activating the add adaptor button 515, or a private network by activating the add private network button 517.

Figure 6:
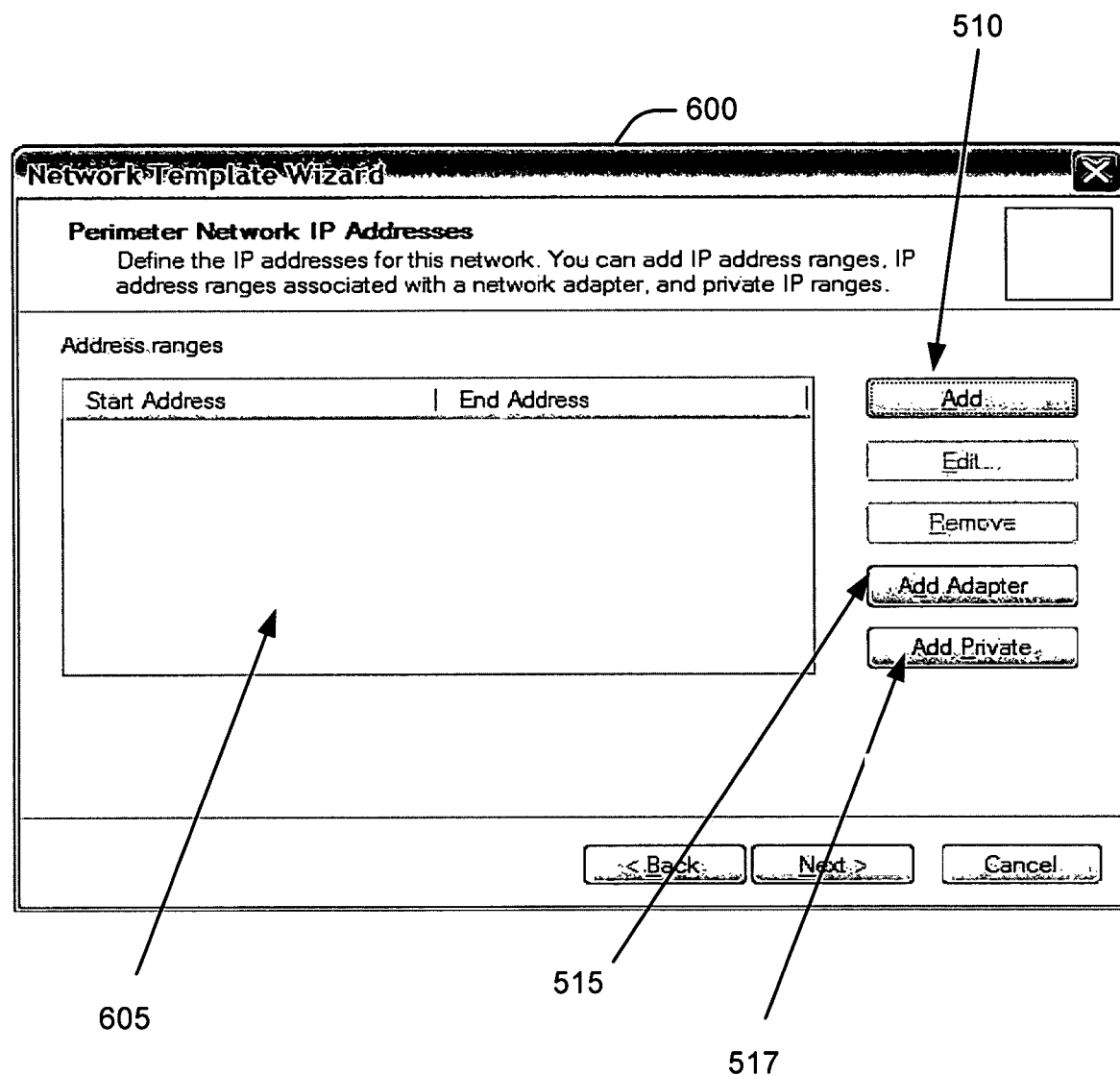
FIG. 6 is another screenshot of the wizard utility associated with the configurator.

FIG. 6 is another screenshot 600 of the wizard utility associated with the configurator. The wizard utility shown in screenshot 600 is currently accepting the addresses for the perimeter network associated with a 3-Leg Perimeter network topology. The wizard utility includes an address range area 605 to show the entered address ranges. A user may add an address range, a network adaptor or a private network by activating buttons 510, 515, and 517, respectively.

Figure 7:
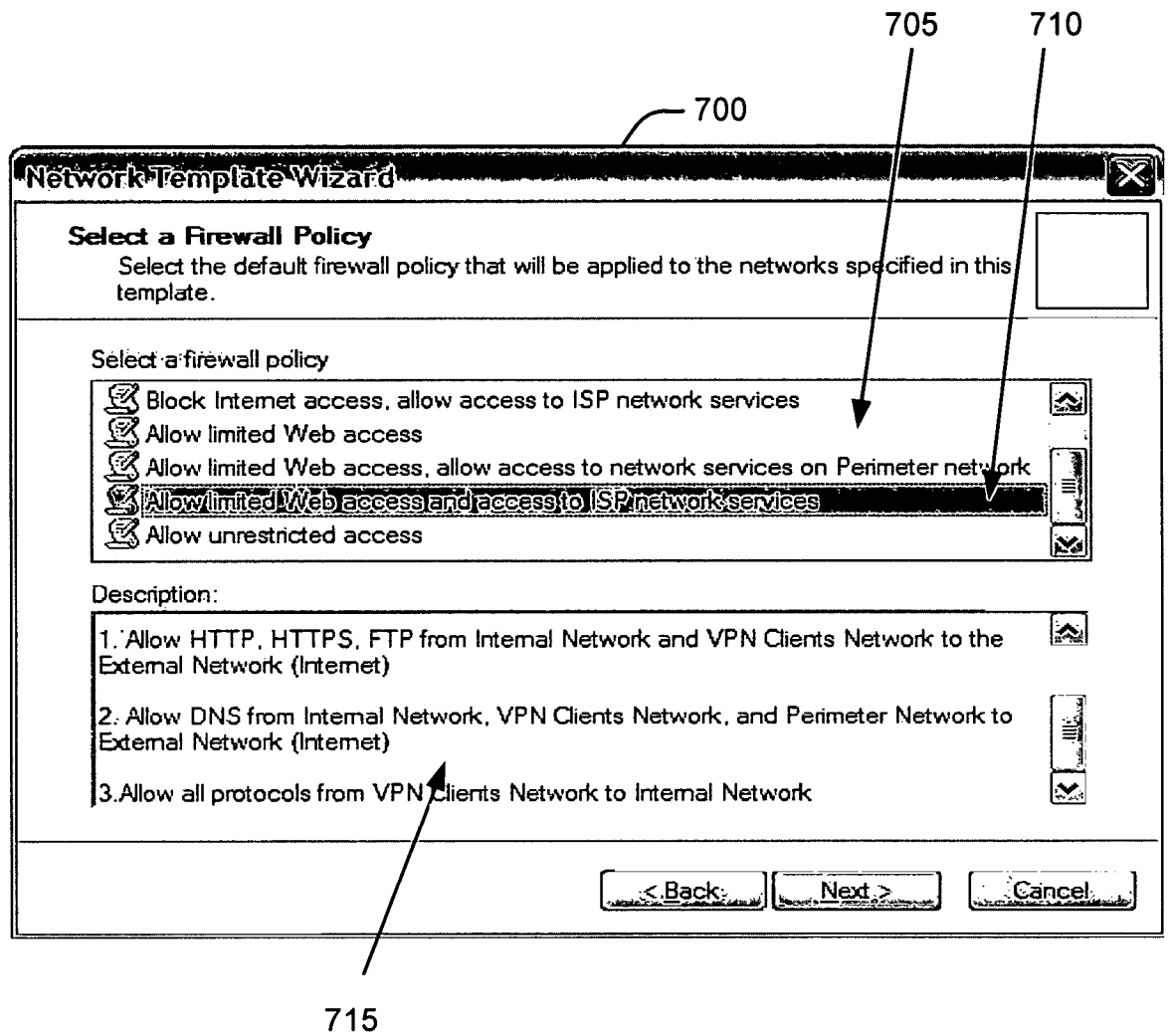
FIG. 7 is yet another screenshot of the wizard utility associated with the configurator.

FIG. 7 is yet another screenshot 700 of the wizard utility associated with the configurator. The wizard utility shown in screenshot 700 presents policies that are associated with the currently selected network template. The wizard utility may include a policy selection area 705 to present the available policies and to allow a user to select one or more of the policies. As shown in FIG. 7, the policy being selected is shown with highlight 710. The wizard utility may also include a policy description area 715 to provide information that describes the selected policy.

Figure 8:
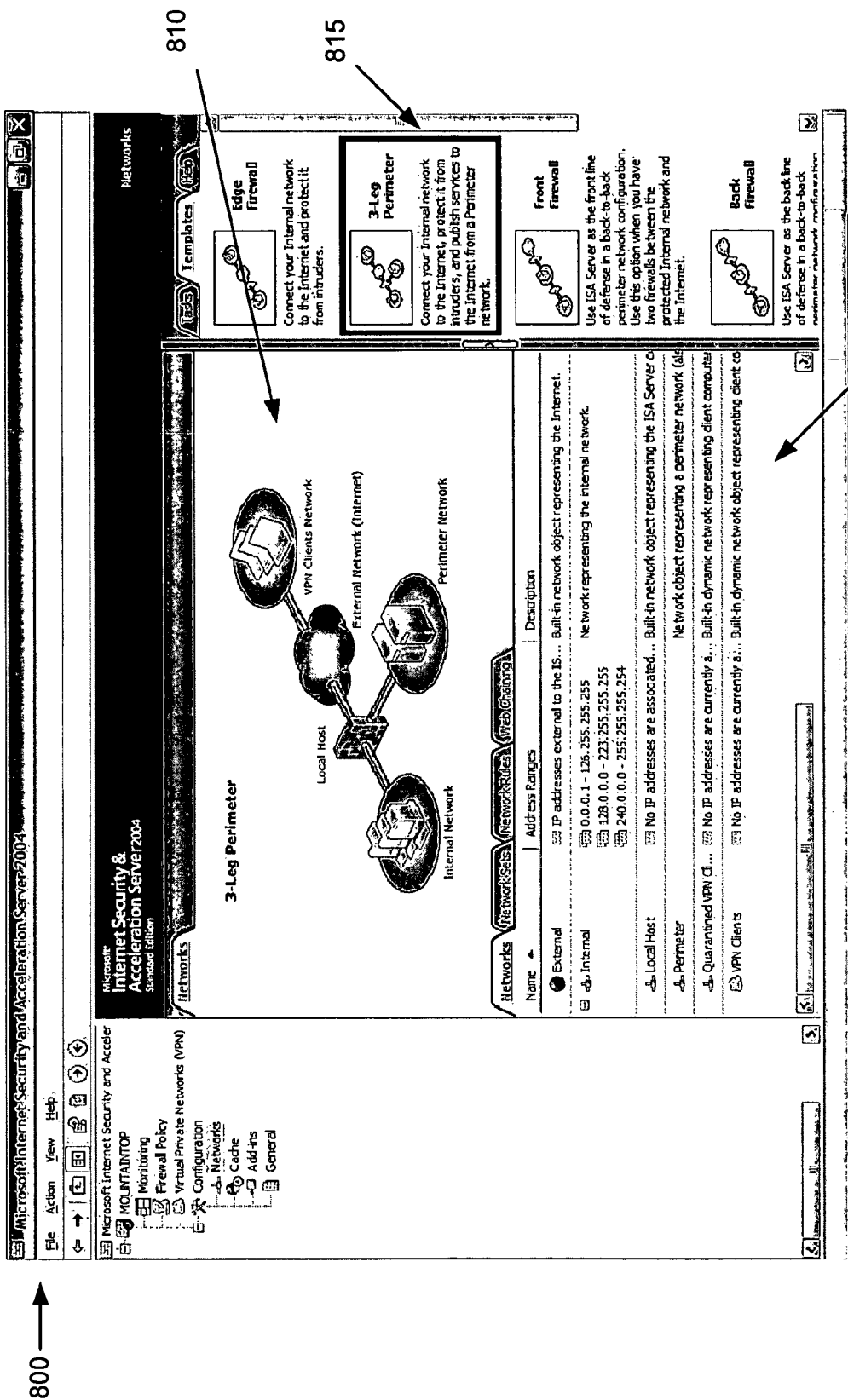
FIG. 8 is another screenshot of the user interface associated with the configurator.

FIG. 8 is another screenshot 800 of the user interface associated with the configurator. After a new network template has been selected and properly configured, the user interface displays a graph 810 to illustrate the network topology of the newly selected network template. Parameters 820 associated with the selected network template are also displayed. Border 815 is displayed to show that the "3-Leg Perimeter" network template is currently selected.

Figure 9:
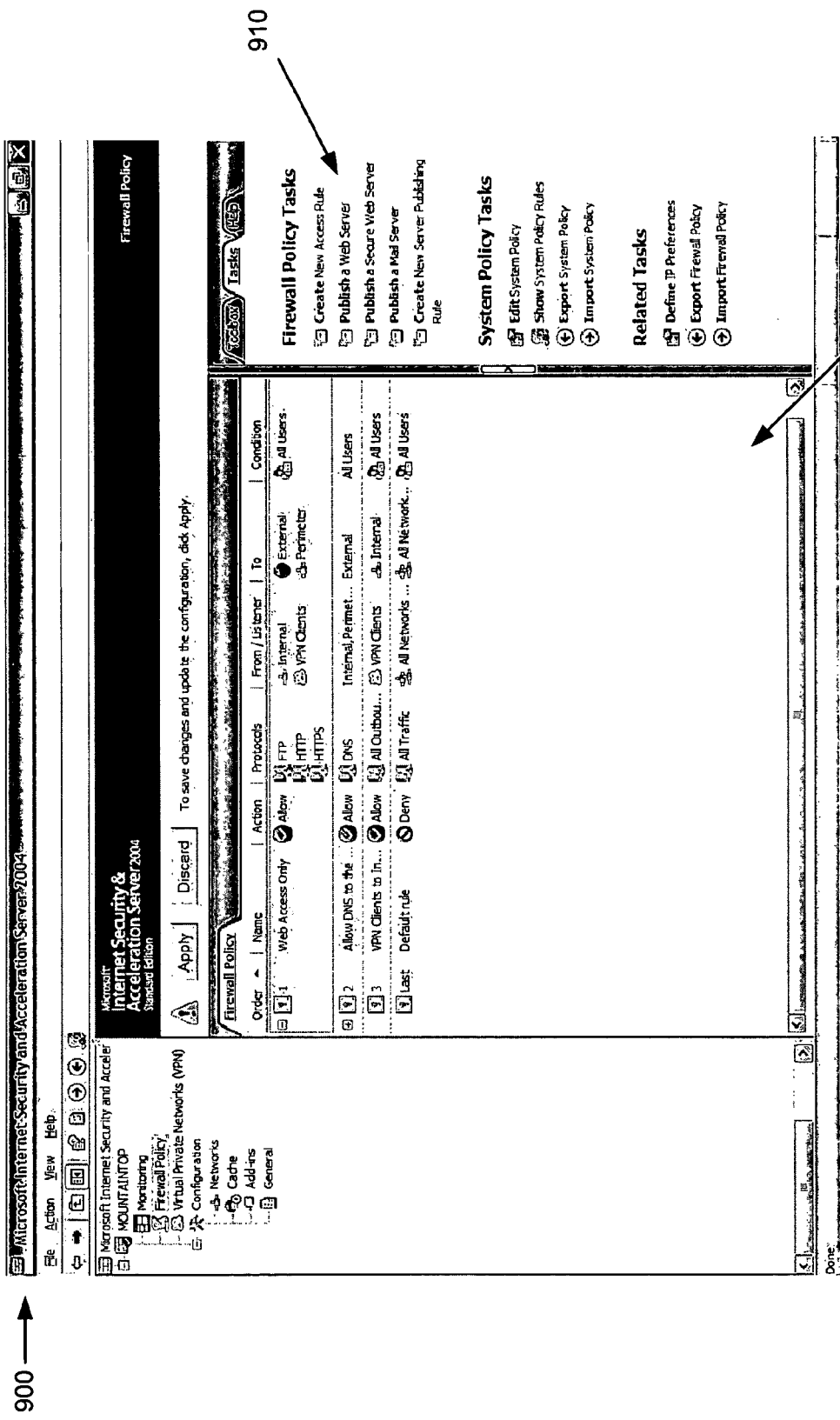
FIG. 9 is yet another screenshot of the user interface associated with the configurator.

FIG. 9 is yet another screenshot 900 of the user interface associated with the configurator. The user interface includes a policy area 915 to display the selected policies for the currently selected network template. A user may add, delete, modify and manipulate the selected policies by selecting tasks in a task display area 910.

Figure 10:
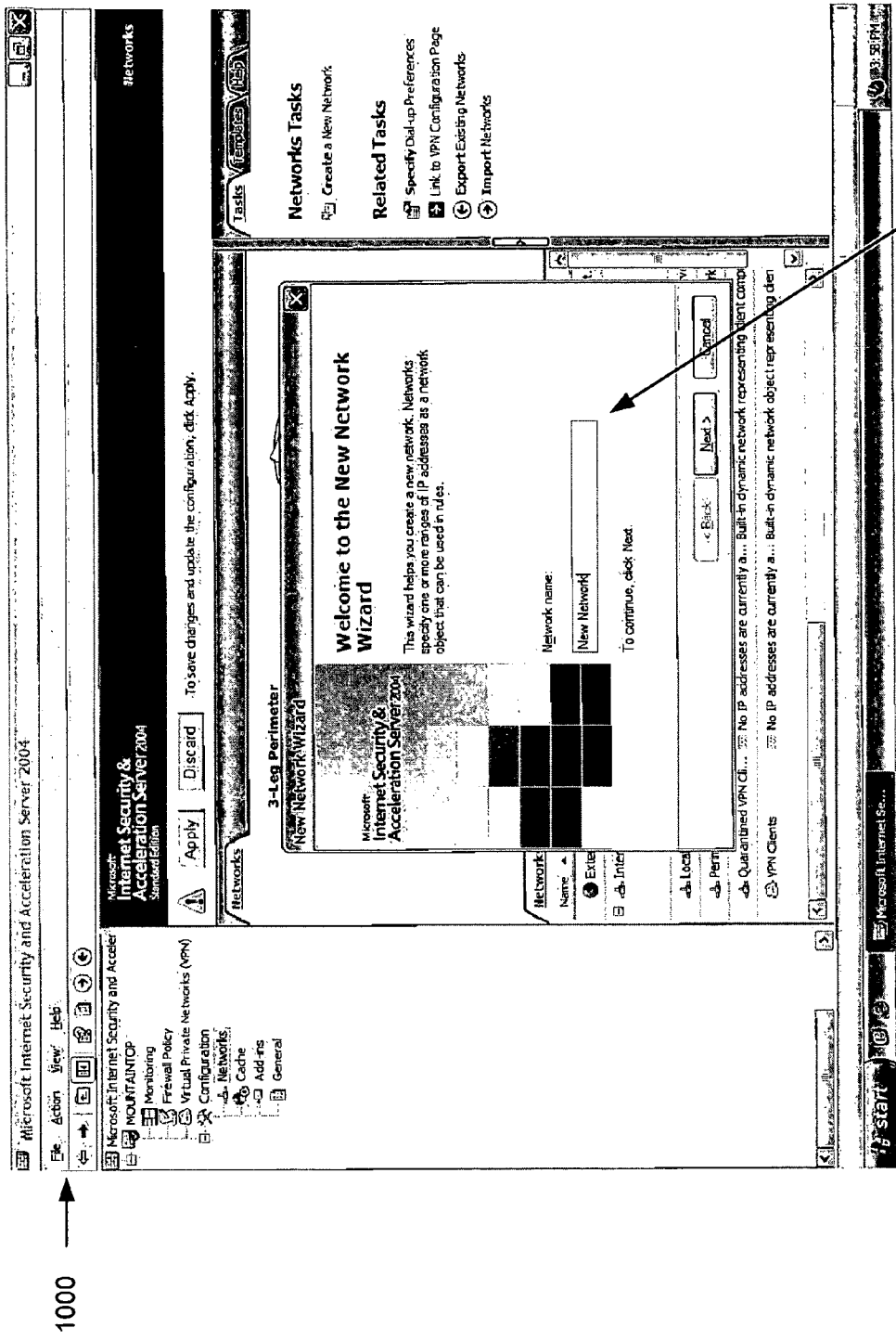
FIG. 10 is still another screenshot of the user interface associated with the configurator.

FIG. 10 is still another screenshot 1000 of the user interface associated with the configurator. A user may add another network to a currently selected network template by invoking a new network wizard utility 1010.

Figure 11:
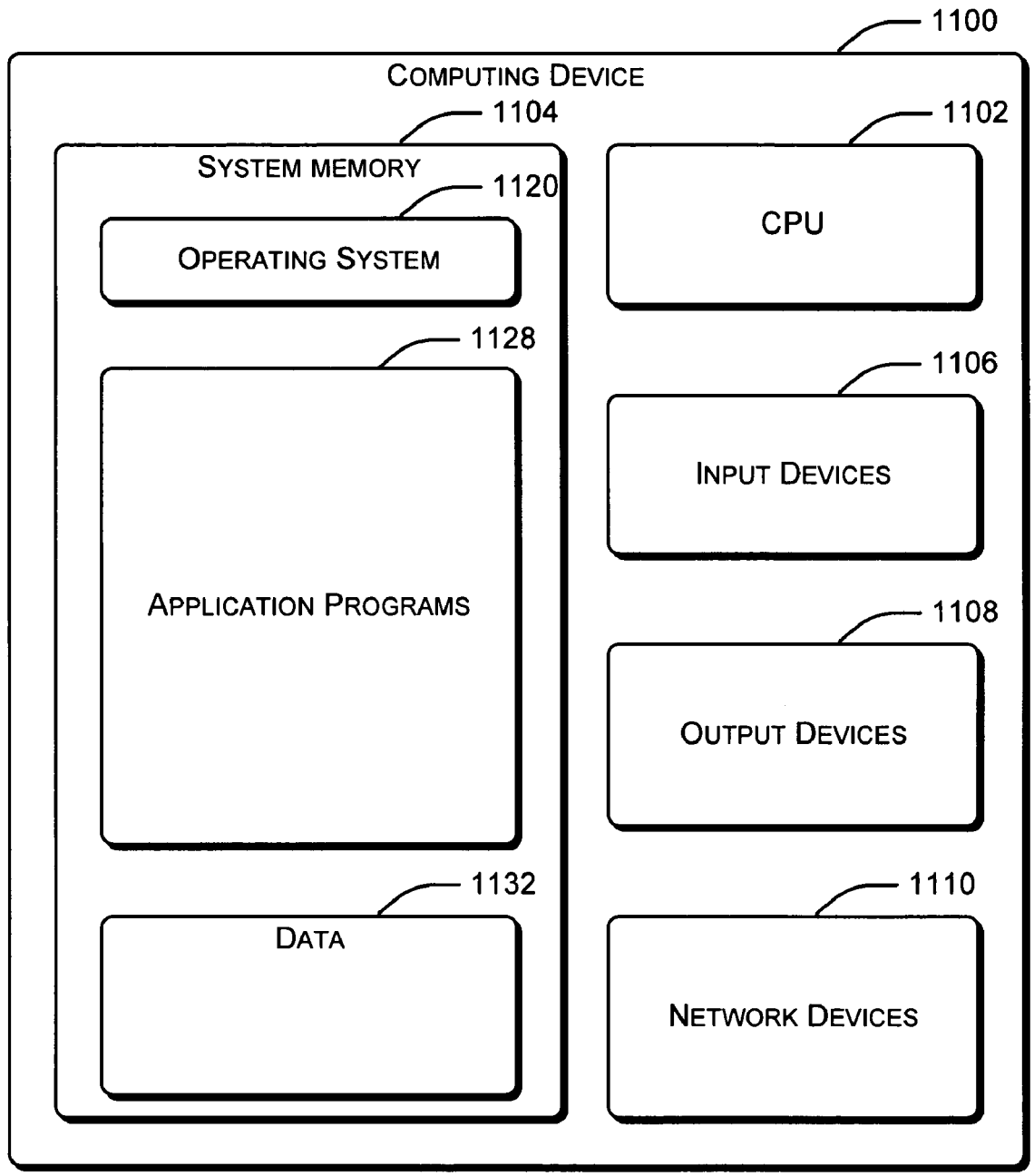
FIG. 11 illustrates an example computing device within which the described systems and methods can be either fully or partially implemented.

FIG. 11 illustrates an example computing device 1100 within which the described systems and methods can be either fully or partially implemented. Computing device 1100 is only one example of a computing system and is not intended to suggest any limitation as to the scope of the use or functionality of the invention.

Computing device 1100 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The components of computing device 1100 can include, but are not limited to, processor 1102 (e.g., any of microprocessors, controllers, and the like), system memory 1104, input devices 1106, output devices 1108, and network devices 1110.

Computing device 1100 typically includes a variety of computer-readable media. Such media can be any available media that is accessible by computing device 1100 and includes both volatile and non-volatile media, removable and non-removable media. System memory 1104 includes computer-readable media in the form of volatile memory, such as random access memory (RAM), and/or non-volatile memory, such as read only memory (ROM). A basic input/output system (BIOS), containing the basic routines that help to transfer information between elements within computing device 1100, such as during start-up, is stored in system memory 1104. System memory 1104 typically contains data and/or program modules that are immediately accessible to and/or presently operated on by processor 1102.

System memory 1104 can also include other removable/non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computing device 1100. It is to be appreciated that other types of computer-readable media which can store data that is accessible by computing device 1100, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computing device 1100. Any number of program modules can be stored in system memory 1104, including by way of example, an operating system 1120, application programs 1128, and data 1132.

Computing device 1100 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 1100 via input devices 1106 such as a keyboard and a pointing device (e.g., a "mouse"). Other input devices 1106 may include a microphone, joystick, game pad, controller, satellite dish, serial port, scanner, touch screen, touch pads, key pads, and/or the like. Output devices 1108 may include a CRT monitor, LCD screen, speakers, printers, and the like.

Computing device 1100 may include network devices 1110 for connecting to computer networks, such as local area network (LAN), wide area network (WAN), and the like.

Network templates may be implemented in any programming language. To enhance portability and ease of programming, network templates may be implemented in a markup language, such as extensible markup language (XML). Below is an example code of a network template implemented in XML.

Network Template xml file description.

Each xml file has the following structure:

```
<?xml version="1.0" encoding="UTF-8"?>
The root element for the tree:
<fpc4:Root xmlns:fpc4=XML_ISA_NAMESPACE_URI
xmlns:dt="urn:schemas-microsoft-com:datatypes"
StorageName="FPC" StorageType="0">
Some general attributes:
    <fpc4:Build dt:dt="string">4.0.1650.50</fpc4:Build>
    <fpc4:Comment dt:dt="string"/>
    <fpc4:Edition dt:dt="int">81</fpc4:Edition>
    <fpc4:ExportItemClassCLSID dt:dt="string">{E603489F-FA78-41CA-ADFE-EDC572C944DE}</fpc4:ExportItemClassCLSID>
    <fpc4:IsaXmlVersion dt:dt="string">1.0</fpc4:IsaXmlVersion>
    <fpc4:OptionalData dt:dt="int">12</fpc4:OptionalData>
    <fpc4:Arrays StorageName="Arrays" StorageType="0">
        <fpc4:Array StorageName="{34C74CA1-7D08-4205-921E-2652D998752D}" StorageType="1">
            <fpc4:Components dt:dt="int">62</fpc4:Components>
            <fpc4:Name dt:dt="string">Name</fpc4:Name>
```

The Network configuration.

This is a description of the network topology which consists of networks, network sets, and network rules that specify the relationship between 2 networks.

```
<fpc4:NetConfig StorageName="NetConfig" StorageType="1">
    <fpc4:Networks StorageName="Networks" StorageType="1">
A network with it's attributes (this is the internal network)
        <fpc4:Network StorageName=INTERNAL_NETWORK_GUID StorageType="1">
            <fpc4:Description dt:dt="string"
FromResource=FPC_DLL>IDS_INTERNAL_NETWORK_DESC</fpc4:Description>
            <fpc4:EnableFirewallClients dt:dt="boolean">1</fpc4:EnableFirewallClients>
            <fpc4:EnableWebProxyClients dt:dt="boolean">1</fpc4:EnableWebProxyClients>
            <fpc4:Name dt:dt="string"
FromResource=FPC_DLL>IDS_INTERNAL_NETWORK_NAME</fpc4:Name>
            <fpc4:NetworkType dt:dt="int">4</fpc4:NetworkType>
        </fpc4:Network>
A network with it's attributes (this is the external network)
        <fpc4:Network StorageName=EXTERNAL_NETWORK_GUID StorageType="1">
            <fpc4:Description dt:dt="string"
FromResource=FPC_DLL>IDS_DEFAULT_EXTERNAL_NETWORK_DESC</fpc4:Description>
            <fpc4:Name dt:dt="string"
FromResource=FPC_DLL>IDS_DEFAULT_EXTERNAL_NETWORK_NAME</fpc4:Name>
            <fpc4:NetworkType dt:dt="int">3</fpc4:NetworkType>
        </fpc4:Network>
        <fpc4:Network StorageName=PERIMETER_NETWORK_GUID StorageType="1">
            <fpc4:Description dt:dt="string"
FromResource=FPC_DLL>IDS_PERIMETER_NETWORK_DESC</fpc4:Description>
            <fpc4:Name dt:dt="string"
FromResource=FPC_DLL>IDS_PERIMETER_NETWORK_NAME</fpc4:Name>
            <fpc4:NetworkType dt:dt="int">0</fpc4:NetworkType>
        </fpc4:Network>
    </fpc4:Networks>
    <fpc4:NetworkRules StorageName="NetworkRules" StorageType="1">
This is a network rule.
From: QUARANTINED_VPN_CLIENTS_NETWORK,VPN_CLIENTS_NETWORK
To: INTERNAL_NETWORK
RoutingType: 0 (rout).
        <fpc4:NetworkRule StorageName=VPN2INT_NETWORKRULE_GUID
```

-continued

```
StorageType="1">
        <fpc4:Enabled dt:dt="boolean">1</fpc4:Enabled>
        <fpc4:Name dt:dt="string"
FromResource=FPC_DLL>IDS_VPN_INTERNAL_NETWORK_RULE</fpc4:Name>
        <fpc4:Order dt:dt="bin.hex">01 00 00 00 00 00 00 00</fpc4:Order>
        <fpc4:RoutingType dt:dt="int">0</fpc4:RoutingType>
        <fpc4:SelectionIPs StorageName="SourceSelectionIPs" StorageType="1">
            <fpc4:Refs StorageName="Networks" StorageType="1">
                <fpc4.Ref
StorageName=QUARANTINED_VPN2INT_NETWORKRULE_SRC_NET_GUID
StorageType="1">
                    <fpc4:Name
dt:dt="string">QUARANTINED_VPN_CLIENTS_NETWORK_GUID</fpc4:Name>
                    <fpc4:RefClass dt:dt="string">msFPCNetwork</fpc4:RefClass>
                </fpc4:Ref>
                <fpc4:Ref StorageName=VPN2INT_NETWORKRULE_SRC_NET_GUID
StorageType="1">
                    <fpc4:Name dt:dt="string">VPN_CLIENTS_NETWORK_GUID</fpc4:Name>
                    <fpc4:RefClass dt:dt="string">msFPCNetwork</fpc4:RefClass>
                </fpc4:Ref>
            </fpc4:Refs>
        </fpc4:SelectionIPs>
        <fpc4:SelectionIPs StorageName="DestinationSelectionIPs" StorageType="1">
            <fpc4:Refs StorageName="Networks" StorageType="1">
                <fpc4:Ref StorageName=VPN2INT_NETWORKRULE_DST_NET_GUID
StorageType="1">
                    <fpc4:Name dt:dt="string">INTERNAL_NETWORK_GUID</fpc4:Name>
                    <fpc4:RefClass dt:dt="string">msFPCNetwork</fpc4:RefClass>
                </fpc4:Ref>
            </fpc4:Refs>
        </fpc4:SelectionIPs>
    </fpc4:NetworkRule>
    <fpc4:NetworkRule StorageName=INT2DMZ_NETWORKRULE_GUID
StorageType="1">
        <fpc4:Enabled dt:dt="boolean">1</fpc4:Enabled>
        <fpc4:Name dt:dt="string"
FromResource=FPC_DLL>IDS_PERIMETER_CONFIGURATION_RULE</fpc4:Name>
        <fpc4:Order dt:dt="bin.hex">02 00 00 00 00 00 00 00</fpc4:Order>
        <fpc4:RoutingType dt:dt="int">1</fpc4:RoutingType>
        <fpc4:SelectionIPs StorageName="SourceSelectionIPs" StorageType="1">
            <fpc4:Refs StorageName="Networks" StorageType="1">
                <fpc4:Ref StorageName="{7C2C8CA1-11BA-4F51-B147-19B952DAA4D6}"
StorageType="1">
                    <fpc4:Name dt:dt="string">INTERNAL_NETWORK_GUID</fpc4:Name>
                    <fpc4:RefClass dt:dt="string">msFPCNetwork</fpc4:RefClass>
                </fpc4:Ref>
                <fpc4:Ref StorageName="{097D8CAD-8FE9-4188-9FA6-3BDC19D5D217}"
StorageType="1">
                    <fpc4:Name
dt:dt="string">QUARANTINED_VPN_CLIENTS_NETWORK_GUID</fpc4:Name>
                    <fpc4:RefClass dt:dt="string">msFPCNetwork</fpc4:RefClass>
                </fpc4:Ref>
                <fpc4:Ref StorageName="{0DF10D3F-11CA-4d6e-89AD-781F44D47983}"
StorageType="1">
                    <fpc4:Name dt:dt="string">VPN_CLIENTS_NETWORK_GUID</fpc4:Name>
                    <fpc4:RefClass dt:dt="string">msFPCNetwork</fpc4:RefClass>
                </fpc4:Ref>
            </fpc4:Refs>
        </fpc4:SelectionIPs>
        <fpc4:SelectionIPs StorageName="DestinationSelectionIPs" StorageType="1">
            <fpc4:Refs StorageName="Networks" StorageType="1">
                <fpc4:Ref StorageName="{517FC485-BFC3-4B10-86BE-DEBF728D3EE1}"
StorageType="1">
                    <fpc4:Name dt:dt="string">PERIMETER_NETWORK_GUID</fpc4:Name>
                    <fpc4:RefClass dt:dt="string">msFPCNetwork</fpc4:RefClass>
                </fpc4:Ref>
            </fpc4:Refs>
        </fpc4:SelectionIPs>
    </fpc4:NetworkRule>
    <fpc4:NetworkRule StorageName=DMZ2EXT_NETWORKRULE_GUID
StorageType="1">
        <fpc4:Enabled dt:dt="boolean">1</fpc4:Enabled>
        <fpc4:Name dt:dt="string"
FromResource=FPC_DLL>IDS_PERIMETER_ACCESS_RULE</fpc4:Name>
        <fpc4:Order dt:dt="bin.hex">03 00 00 00 00 00 00 00</fpc4:Order>
        <fpc4:RoutingType dt:dt="int">0</fpc4:RoutingType>
        <fpc4:SelectionIPs StorageName="SourceSelectionIPs" StorageType="1">
            <fpc4:Refs StorageName="Networks" StorageType="1">
                <fpc4:Ref StorageName="{288D6E80-B563-4EAF-A256-61C657B8A4DF}"
```

-continued

```
StorageType="1">
            <fpc4:Name dt:dt="string">PERIMETER_NETWORK_GUID</fpc4:Name>
            <fpc4:RefClass dt:dt="string">msFPCNetwork</fpc4:RefClass>
          </fpc4:Ref>
        </fpc4:Refs>
      </fpc4:SelectionIPs>
      <fpc4:SelectionIPs StorageName="DestinationSelectionIPs" StorageType="1">
        <fpc4:Refs StorageName="Networks" StorageType="1">
          <fpc4:Ref StorageName="{588D09FC-E0CB-4506-8FCD-5C46F5FC645E}" StorageType="1">
            <fpc4:Name dt:dt="string">EXTERNAL_NETWORK_GUID</fpc4:Name>
            <fpc4:RefClass dt:dt="string">msFPCNetwork</fpc4:RefClass>
          </fpc4:Ref>
        </fpc4:Refs>
      </fpc4:SelectionIPs>
    </fpc4:NetworkRule>
    <fpc4:NetworkRule StorageName=INT2EXT_NETWORKRULE_GUID StorageType="1">
      <fpc4:Enabled dt:dt="boolean">1</fpc4:Enabled>
      <fpc4:Name dt:dt="string" FromResource=FPC_DLL>IDS_DEFAULT_EXTERNAL_NETWORK_RULE</fpc4:Name>
      <fpc4:Order dt:dt="bin.hex">04 00 00 00 00 00 00 00</fpc4:Order>
      <fpc4:RoutingType dt:dt="int">1</fpc4:RoutingType>
      <fpc4:SelectionIPs StorageName="SourceSelectionIPs" StorageType="1">
        <fpc4:Refs StorageName="Networks" StorageType="1">
          <fpc4:Ref StorageName=INT2EXT_NETWORKRULE_SRC_NET_GUID StorageType="1">
            <fpc4:Name dt:dt="string">INTERNAL_NETWORK_GUID</fpc4:Name>
            <fpc4:RefClass dt:dt="string">msFPCNetwork</fpc4:RefClass>
          </fpc4:Ref>
          <fpc4:Ref StorageName=QUARANTINED_VPN2EXT_NETWORKRULE_SRC_NET_GUID StorageType="1">
            <fpc4:Name dt:dt="string">QUARANTINED_VPN_CLIENTS_NETWORK_GUID</fpc4:Name>
            <fpc4:RefClass dt:dt="string">msFPCNetwork</fpc4:RefClass>
          </fpc4:Ref>
          <fpc4:Ref StorageName=VPN2EXT_NETWORKRULE_SRC_NET_GUID StorageType="1">
            <fpc4:Name dt:dt="string">VPN_CLIENTS_NETWORK_GUID</fpc4:Name>
            <fpc4:RefClass dt:dt="string">msFPCNetwork</fpc4:RefClass>
          </fpc4:Ref>
        </fpc4:Refs>
      </fpc4:SelectionIPs>
      <fpc4:SelectionIPs StorageName="DestinationSelectionIPs" StorageType="1">
        <fpc4:Refs StorageName="Networks" StorageType="1">
          <fpc4:Ref StorageName=INT2EXT_NETWORKRULE_DST_NET_GUID StorageType="1">
            <fpc4:Name dt:dt="string">EXTERNAL_NETWORK_GUID</fpc4:Name>
            <fpc4:RefClass dt:dt="string">msFPCNetwork</fpc4:RefClass>
          </fpc4:Ref>
        </fpc4:Refs>
      </fpc4:SelectionIPs>
    </fpc4:NetworkRule>
  </fpc4:NetworkRules>
</fpc4:NetConfig>
```

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method for managing networks, comprising:
providing a plurality of network templates that are each associated with a different network topology and include parameters for implementing the associated network topology;
selecting at least one of the plurality of network templates, wherein each of the plurality of network templates includes multiple security policies for a user to select, wherein the multiple security policies are tested for compatibility prior to selection and provide varying levels of security and network performance;
configuring a network device or providing a wizard utility for inputting information to implement the network topology associated with the selected network template based, at least in part, on the parameters, the wizard utility including an address range area to show an address range for the selected network template;
displaying the parameters associated with the selected network template to the user; and
presenting a secondary wizard utility for guiding the user in customizing the selected network template, the secondary wizard utility is further to:
query the user for network addresses to be used for one or more networks in each of the one or more selected network templates; and present the user with a selection of security policies tailored for the one or more selected network templates by displaying a policy selection area to present available security policies and a policy description area to provide information that describes each security policy.

2. The method as recited in claim 1, wherein the network device is a firewall.

3. The method as recited in claim 1, wherein the parameters for implementing the associated selected network template include at least one of network identifiers, grouping, relationship, or policy.

4. The method as recited in claim 1, further comprising:
determining addresses associated with private networks included in the selected network template; and
configuring the network device with the addresses.

5. The method as recited in claim 4, wherein the private networks include at least one of an internal network, a perimeter network, a DMZ network, a departmental network, a virtual private network (VPN), or an intranet.

6. The method as recited in claim 1, further comprising:
enabling a selection of at least one policy from a set of policies associated with the selected network templates; and
upon receiving a selection, configuring the network device with the selected policy.

7. The method as recited in claim 6, further comprising customizing the selected network template with the selected policy.

8. The method as recited in claim 1, wherein the network topologies associated with the plurality of network templates include at least one of an edge firewall, a 3-Leg demilitarized zone (DMZ), a front firewall, a back firewall, a departmental firewall, a branch office, and a line filter.

9. The method as recited in claim 7, wherein each network template is pre-defined and pre-tested prior to selecting the one or more network templates.

10. A method for configuring a firewall, comprising:
selecting one or more of a plurality of network templates that each include parameters associated with a particular network topology,
wherein each of the plurality of network templates consists of multiple security policies for a user to select, wherein the multiple security policies are tested for compatibility prior to selection and provide varying levels of security and network performance;
providing a wizard utility to input information for implementing the network topology associated with the selected network template, the wizard utility including an address range area to show an address range for the selected network template;
presenting a secondary wizard utility to guide the user in customizing the selected network template, the secondary wizard utility is further to:
query the user for network addresses to be used for one or more networks in each of the one or more selected network templates; and
present the user with a selection of security policies tailored for the one or more selected network templates by displaying a policy selection area to present available security policies and a policy description area to provide information that describes each security policy;
determining addresses associated with private networks coupled to the firewall; and
configuring the firewall to implement the network topology in accordance with the parameters included in the selected network template and the addresses.

11. The method as recited in claim 10, further comprising:
presenting a plurality of security policies associated with the selected network template for selection;
receiving a selection of at least one of the security policies; and
configuring the firewall to implement the selected security policy.

12. The method as recited in claim 10, further comprising:
determining at least one security policy associated with the selected network template; and
configuring the firewall to implement the determined security policy.

13. A system, comprising:
a firewall coupled to a plurality of private networks and an external network; and
a configurator coupled to the firewall, the configurator including a plurality of network templates having parameters associated with a particular network topology, the configurator is to select at least one of the network templates and to configure the firewall with the parameters associated with the selected network template,
wherein each of the plurality of network templates includes multiple security policies for the configurator to select, wherein further the multiple security policies are tested for compatibility prior to selection and provide varying levels of security and network performance;
a wizard utility associated with the configurator to input information for implementing the network topology associated with the selected network template, the wizard utility including an address range area to show an address range for the selected network template; and
a secondary wizard utility associated with the configurator to guide the user in customizing the selected network template, the secondary wizard utility is further to:
query the user for network addresses to be used for one or more networks in each of the one or more selected network templates; and
present the user with a selection of security policies tailored for the one or more selected network templates by displaying a policy selection area to present available security policies and a policy description area to provide information that describes each security policy.

14. The system as recited in claim 13, wherein the configurator is to further determine addresses associated with the private networks and to configure the firewall with the addresses.

15. The system as recited in claim 13, wherein the configurator is to further determine the addresses from user input.

16. The system as recited in claim 13, wherein the configurator is to further determine security policies associated with a selected network template and to apply at least one of the security policies to configure the firewall.

17. The system as recited in claim 16, wherein the configurator is to further enable a user selection of the at least one security policy.

18. The system as recited in claim 13, wherein the configurator is to further automatically apply a default security policy associated with the selected network template.

19. The system as recited in claim 13, wherein the private networks include at least one of an internal network, a perimeter network, a DMZ network, a departmental network, a virtual private network (VPN), or an intranet.

20. The system as recited in claim 13, wherein the external networks include at least one of a wide area network (WAN) or the Internet.

21. A computer-readable storage medium, comprising:
   a data structure representing a plurality of network templates that are each associated with a different network topology;
      wherein each of the plurality of network templates consists of multiple security policies for selection, wherein the multiple security policies are tested for compatibility prior to selection and provide varying levels of security and network performance;
   a wizard utility to select at least one of the plurality of network templates and to input information for implementing the network topology associated with the selected network template, the wizard utility including an address range area to show an address range for the selected network template;
   a secondary wizard utility for guiding a user in customizing the at least one of the plurality of network templates, the secondary wizard utility is further to:
      query the user for network addresses to be used for one or more networks in each of the one or more selected network templates; and
      present the user with a selection of security policies tailored for the one or more selected network templates by displaying a policy selection area to present available security policies and a policy description area to provide information that describes each security policy; and
   information for implementing the associated network topology with a firewall.

22. The computer-readable storage medium as recited in claim 21, wherein the information in the data structure includes network identifiers representing networks and network nodes that are included in a network topology associated with at least one of the network templates.

23. The computer-readable storage medium as recited in claim 21, wherein the information in the data structure includes grouping identifiers representing groups of networks in a network topology associated with at least one of the network templates.

24. The computer-readable storage medium as recited in claim 21, wherein the information in the data structure includes relationship identifiers representing how networks in a network topology associated with at least one of the network templates relate and interact with each other.

25. The computer-readable storage medium as recited in claim 21, wherein the information in the data structure includes security policies related to a network topology associated with at least one of the network templates.

26. The computer-readable storage medium as recited in claim 21, wherein the information in the data structure includes data for presenting at least one of the network templates in a user interface.

27. The computer-readable storage medium as recited in claim 21, wherein the data structure is in extensible markup language (XML).

28. A method for handling networking information in a user interface, comprising:
   graphically presenting a plurality of network templates on the user interface, each network template including parameters associated with a particular network topology;
   selecting at least one of the network templates;
   providing a wizard utility for inputting information for implementing the network topology associated with the selected network template, the wizard utility including an address range area to show an address range for the selected network template,
      wherein the wizard utility enables the input of at least one of addresses associated private networks, security policy selection, and information for customizing at least one of the network templates;
   presenting a secondary wizard utility that guides a user in customizing the at least one of the selected network templates, the secondary wizard utility is further to:
      query the user for network addresses to be used for one or more networks in each of the one or more selected network templates; and
      present the user with a selection of security policies tailored for the one or more selected network templates by displaying a policy selection area to present available security policies and a policy description area to provide information that describes each security policy; and
   graphically presenting information associated with the implemented network topology.

29. The method as recited in claim 28, wherein graphically presenting the plurality of network templates on the user interface includes presenting a graph that illustrates the network topology associated with each network template.

* * * * *